2,905,201
Patented Sept. 22, 1959

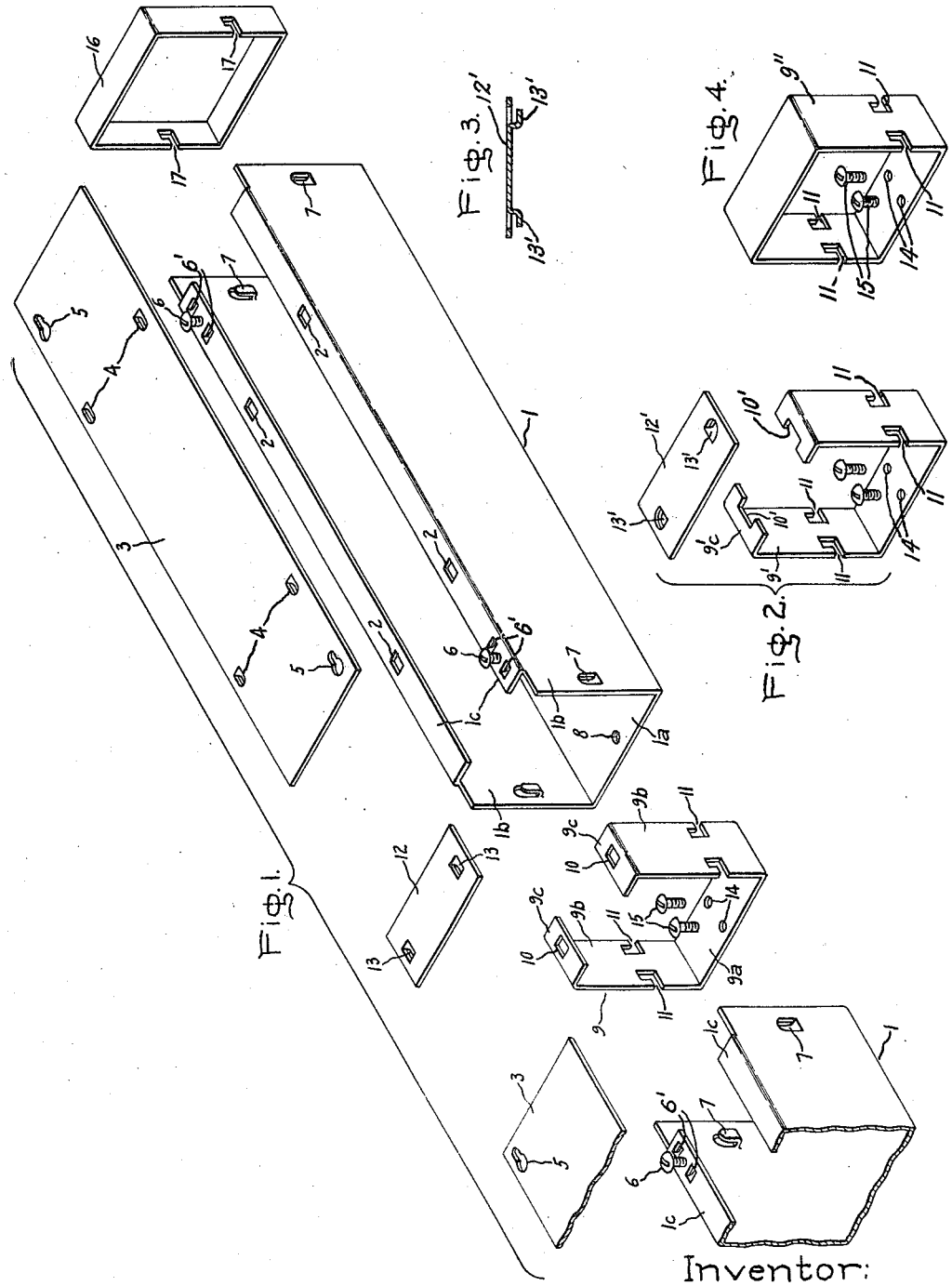

2,905,201
SECTIONAL WIRING DUCT

James L. McNaughton, Seattle, Wash., assignor to General Electric Company, a corporation of New York Application September 30, 1953, Serial No. 383,175

4 Claims. (Cl. 138—75)

My invention relates to sectional wiring ducts, and more particularly to coupling means for interconnecting adjacent duct sections.

Channel-shaped metal wiring ducts used to enclose bundles of loose electric wires are commonly made in sectional form for connection of the sections in end-to-end relation, with special fittings being provided for coupling the sections, closing the ends of the ducts, and covering the ducts to complete the enclosure. In such sectional ducts it is desirable to provide connecting means for the consecutive sections and for the end and cover fittings, so arranged that the parts fit together simply and quickly with a minimum of bolts or other separate fastening means. It is also highly desirable that the duct sections be firmly and rigidly connected together while leaving the entire top side of the duct open, so that wires may be laid in place, rather than threaded through coupling collars of the closed ring type.

Accordingly, therefore, it is a principal object of my invention to provide a sectional wiring duct having a coupling collar which is simple and inexpensive, and which is quickly interlocked with the adjacent duct sections in a manner rigidly to hold the sections in assembled relation before complete closure of the ducts.

It is a more particular object of my invention to provide an open-sided sectional wiring duct having a coupling collar for adjacent duct sections, which collar is itself open-sided thereby to permit rigid assembly of the duct by simple rectilinear motion without the interference of any cross bars at the open side of the duct to interfere with wire placements.

My invention itself will be more fully understood and its various objects and advantages further appreciated by referring now to the following detailed specification taken in conjunction with the accompanying drawing, in which Fig. 1 is an exploded perspective view of a sectional wiring duct embodying my invention; Fig. 2 is an exploded perspective view of a modified form of coupling collar for the wiring duct shown at Fig. 1; Fig. 3 is a side elevational view of a part of the coupling collar shown at Fig. 2; and Fig. 4 is a perspective view of still another form of coupling collar for the wire duct shown at Fig. 1.

Referring now to the drawing and particularly to Fig. 1, I have there shown a sectional metallic wiring duct comprising a pair of open-sided tubular metallic duct sections 1 of rectangular cross sectional configuration arranged for disposition in abutting end-to-end relation, and each having a bottom wall 1a and a pair of opposite side walls 1b. Each duct section is open-ended and provided at the upper ends of its side walls with opposed inturned lips 1c, the inturned lips 1c being foreshortened at each end of the duct to provide for either an interconnecting coupling collar or an end closure plate, as will appear more fully hereinafter. Each inturned lip 1c is provided intermediate its ends with a pair of rectangular apertures 2 to provide for interlocking connection of the duct section with a cooperating cover plate 3 having the same length as the inturned lips 1c. The cover plate 3 is provided at each side edge with a pair of punched out inturned ears 4 similarly oriented to provide for longitudinal sliding interlocking engagement of the cover plate with the duct section by interfitting engagement of the ears 4 in the apertures 2. In addition, each side edge of the cover plate 3 is provided with a keyhole slot 5 for interlocking fastening engagement with a pair of bolts 6 threaded into the inturned ears 1c of the duct sections. As shown, the fastening bolts 6 are preferably located on opposite ends and at opposite sides of the duct sections.

In order to protect conductors within the duct from abrasion by the screws 6 the inturned flanges 1c are preferably lanced out and bent inwardly as shown at 6'. These inwardly projecting portions hold the conductors away from the inner ends of the screws.

Each duct section 1 is further provided adjacent each end of each side wall 1b with an inturned punched out ear or inwardly extending projection 7, the projections 7 being disposed in those portions of the duct side walls which are beyond the ends of the inturned upper lips 1c. In addition, each duct section 1 is preferably provided at opposite ends of its bottom wall 1a with threaded apertures 8, only one of which is shown in the drawing.

For rigidly interconnecting adjacent duct sections 1, I provide a coupling collar of rectangular cross section arranged for enclosed telescoping interposition between the abutting ends of adjacent duct sections. In that embodiment of the invention illustrated at Fig. 1, the coupling collar is formed as a U-shaped band of metal 9 of a size and shape to fit in telescoping relation inside the duct sections 1. The collar 9 includes a bottom wall 9a, a pair of opposite side walls 9b and is open at the top, the top edges of the side walls 9b being provided with inwardly turned lips 9c, each of which is provided with a rectangular aperture 10. Each side wall 9b of the coupling collar 9 is provided at opposite ends with an L-shaped slot 11, the two L-shaped slots on each side wall being disposed in back-to-back relation for interlocking engagement, respectively, with the juxtaposed inturned ears 7 at the adjacent ends of the two abutting duct sections 1. The coupling collar 9 is completed to form a closed ring by the provision of a top cross bar or plate 12, which is arranged to lie across the inturned lips 9c and is itself provided with a pair of inturned longitudinally oriented ears 13 similar to ears 4 and 7 disposed for longitudinal sliding interlocking engagement beneath the wall portions of inturned lips 9c defining the rectangular slots 10. The width of the coupling collar 9 in the direction of the axis of the wiring duct is such that it just fills the space between the foreshortened inturned upper lips 1c of adjacent duct sections. Preferably, the coupling collar 9 is provided also with a pair of bolt holes 14 at opposite sides of its bottom wall 9a to receive a pair of fastening bolts 15.

Finally, I provide an end closure in the form of a rectangular cup-shaped member 16 of the same cross sectional size and configuration as the coupling collar 9 when provided with its top across bar 12. The end closure member 16 thus fits into the end of a duct section 1 in enclosed telescoping relation, and is provided in opposite side walls with a pair of L-shaped slots 17 for interlocking engagement with the inturned ears 7 at the adjacent end of the duct section.

In assembling the wiring duct shown in exploded perspective view at Fig. 1, the two adjacent duct sections 1 are brought together longitudinally with the coupling collar 9 disposed therebetween, the inturned ears 7 of the duct sections being slipped into the longitudinally disposed portions of the L-shaped slots 11 in the coupling collar. When the ends of the duct sections are in abutting engagement, the U-shaped collar 9 is moved downwardly against the bottom walls 1a of the duct sections 1 thereby to interlock the sections. If desired, the collar 9 may be fixed in this position by slipping the bolts 15 through the bolt holes 14 in the collar and threading them into the tapped holes 8 in the bottom walls of the adjacent duct sections. With the U-shaped collar and a pair of adjacent duct sections thus assembled, the inturned lips 9c of the coupling collar fit in coplanar relation between the foreshortened inturned lips 1c of the adjacent duct sections to form in effect a pair of continuous inturned lips for the duct.

If desired, the cross bar 12 may now be placed across the top of the coupling collar 9 by slipping the ears 13 of the cross bar longitudinally into the apertures 10 in the collar, or the cross bar 12 could have been placed across the top of the collar 9 before assembling the collar in position between the adjacent duct sections. Preferably, however, the top cross piece 12 of the coupling collar is allowed to remain disassembled until all the desired wires are in position in the duct, thereby to avoid the necessity of threading the wires through the various coupling collars along the length of the duct.

Assuming then that all the desired wires are in position in the duct, the cross plate 12 of the coupling collar is interlocked in position as described above, and the cover plates 3 for the respective duct sections are similarly slid into interlocking engagement with the inturned upper lips 1c of the duct sections by longitudinal sliding movement to interlock the ears 4 with the slots 2. The cover plates 3 are then held in place by tightening down the fastening bolts 6 in the duct sections and simultaneously serve to prevent ears 13 of cover plate 12 from sliding longitudinally out of engagement with slots 10.

Finally, the end plates 16 are placed in enclosed telescoping relation with the ends of the ducts by sliding them longitudinally onto the juxtaposed ears 7 and then setting the plate 16 downward against the bottom wall of the cooperating duct section.

At Figs. 2 and 3 I have shown a modified form of coupling collar 9' in which the top closure plate 12' interlocks in slightly different manner with the inturned upper lips 9'c of the collar. In that embodiment of the invention shown at Figs. 2 and 3, the inturned lips of the collar are provided with inwardly directed slots 10', rather than the apertures 10 of Fig. 1, and the cross piece 12' is provided with a pair of outwardly directed punched out ears 13' for interlocking engagement with the slots 10'. In this case the side walls of the U-shaped collar 9' must be sprung slightly apart in order to engage the cross plate 12' in interlocking relation. It will be appreciated that, with a coupling collar of this form, the cross plate 12' will be assembled with the collar before assembly of the collar with the duct sections, or else the side walls of the entire duct must be sprung slightly apart to facilitate subsequent assembly of the plate. In all other respects the coupling collar of Figs. 2 and 3 is the same as that of Fig. 1 and like parts have been assigned the same reference numerals.

At Fig. 4 I have shown still another form of coupling collar 9' similar to that of Figs. 1, 2 and 3, except that the collar is formed as an integral closed ring of rectangular configuration in which the top section of the collar is not removable. In all other respects the coupling collar of Fig. 4 is similar to those of Figs. 1, 2 and 3 and like parts have been assigned the same reference numerals.

In the foregoing specification and in the appended claims the slots are defined as L-shaped. This expression is used to designate slots having one portion extending away from an edge of the slotted member and a second portion extending at an angle with respect to the first portion to provide a locking shoulder.

Thus while I have described only certain preferred embodiments of my invention by way of illustration, many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. A sectional wire duct comprising a pair of open-sided tubular duct sections of rectangular cross section having side and bottom walls arranged for disposition in abutting end-to-end relation, each side wall of each said duct section being provided at its upper end with an inturned lip and being provided adjacent both ends with an inwardly extending projection, a U-shaped coupling collar having side and bottom walls arranged for disposition in enclosed telescoping relation with abutting ends of said duct sections, the side walls of said collar each having at its upper end an inturned lip and having at opposite sides a pair of generally L-shaped slots in back-to-back relation for interlocking engagement with the juxtaposed side wall projections on the abutting ends of said duct sections, a closure plate having connecting means for interlocking engagement with the inturned lips of said connecting collar, and a closure plate having connecting means for interlocking connection with the inturned lips of each said duct section.

2. A sectional wire duct comprising a pair of open-sided tubular duct sections of rectangular cross section having side and bottom walls arranged for disposition in abutting end-to-end relation, a coupling collar having side and bottom walls constructed and arranged for disposition in enclosed telescoping relation within abutting ends of said duct sections, the side walls of said collar each having at its upper end an inturned lip and having at opposite sides a pair of generally L-shaped slots in back-to-back relation, each side wall of each duct section having adjacent one end an inwardly extending projection for interlocking engagement with an L-shaped slot in the juxtaposed side wall of said coupling member and having at its upper end an inturned lip extending less than the entire length thereof to enable relative movement between said sections and said collar member in directions transverse to the length of said duct during said interlocking engagement, and closure plates having means for connection to the inturned lips of said ducts and said coupling member.

3. A conduit system for electric conductors including a plurality of duplicate open end sheet metal duct sections, each of said sections having a substantially U-shaped trough body and a movable cover, connecting straps joining the adjacent ends of the duct sections, said straps having at least side and bottom walls conforming to the walls of the troughs, tongues pressed inwardly from the side walls of the troughs, slots in the side walls of the straps receiving said tongues, the strap side walls defining the ends of the slots being clamped between the tongues and the walls of the troughs as the straps and trough ends are slidably engaged, and means interconnecting the bottom walls of the straps and troughs, each of the trough side walls of each duct section having at its upper end an inturned lip extending less than the entire length thereof to enable relative movement between said sections and said strap in directions transverse to the length of said duct sections during said slidable engagement.

4. A conduit system for electric conductors as set forth in claim 3 the strap side walls each also having at its upper end an in-turned lip, the said in-turned lips of said strap side walls lying substantially flush with the in-turned lips of the trough side walls when said strap is in assembled position and extending substantially entirely between the ends of the in-turned lips of the trough side walls of adjacent duct sections.

References Cited in the file of this patent

UNITED STATES PATENTS

| | | |
|---|---|---|
| 171,389 | Klotz | Dec. 21, 1875 |
| 1,051,461 | Smith | Jan. 28, 1913 |
| 1,814,415 | Smith | July 14, 1931 |
| 1,817,034 | Hotchkin | Aug. 4, 1931 |
| 2,081,197 | Goeller | May 25, 1937 |
| 2,316,166 | Huguelet | Apr. 13, 1943 |
| 2,353,121 | Adam et al. | July 11, 1944 |